(No Model.)

G. H. STOCKMANN.
SHEARS FOR CUTTING SHEET METAL.

No. 540,464. Patented June 4, 1895.

WITNESSES.
William N. Barr
Frank Bechtold

INVENTOR
George H. Stockmann
By his Attorneys
Howson & Howson

UNITED STATES PATENT OFFICE.

GEORGE H. STOCKMANN, OF PHILADELPHIA, PENNSYLVANIA.

SHEARS FOR CUTTING SHEET METAL.

SPECIFICATION forming part of Letters Patent No. 540,464, dated June 4, 1895.

Application filed January 4, 1894. Serial No. 495,641. (No model.)

*To all whom it may concern:*

Be it known that I, GEORGE H. STOCKMANN, a citizen of the United States, residing in Philadelphia, Pennsylvania, have invented certain Improvements in Shears for Cutting Sheet Metal, of which the following is a specification.

The object of my invention is to so construct a pair of shears for cutting sheet metal that powerful leverage may be exerted in effecting the cutting, and strips of any desired width may be cut without any such interference of any part of the shears with the cut strips as will prevent continued forward movement of the shears as the cut progresses. This object I attain by constructing the shears of two levers pivoted together and each having a cutting blade at the forward end, and an operating handle at the rear end, one lever having the upper blade and lower handle, and the other lever having the lower blade and the upper handle, the latter lever having also a lateral offset in the rear of its blade and having a portion projecting forwardly beyond the rear end of said blade so as to provide for an advance of the pivot for the lever of the upper blade.

Figure 1:
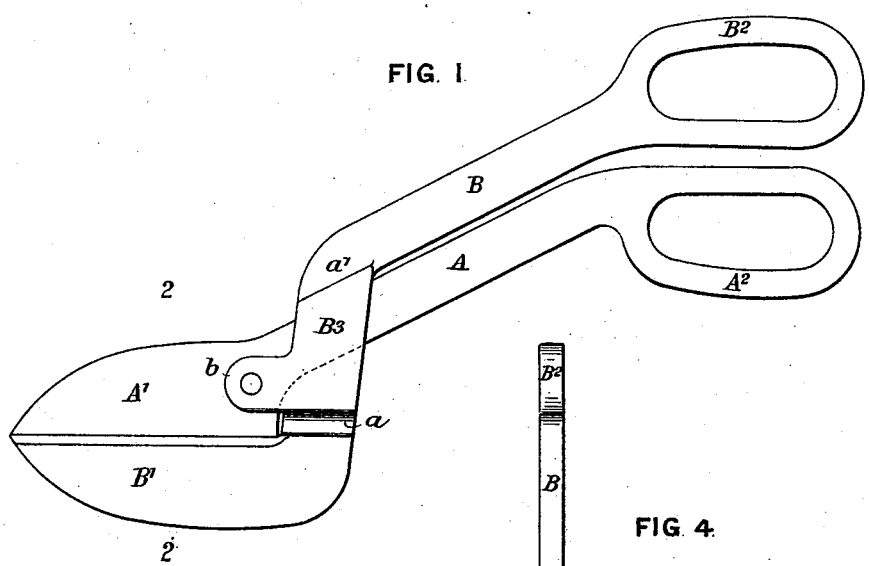
Figure 2:
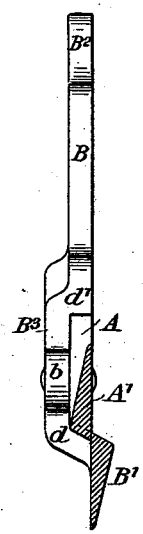
Figure 4:
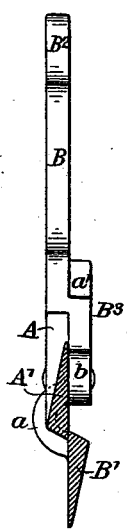
Figure 3:
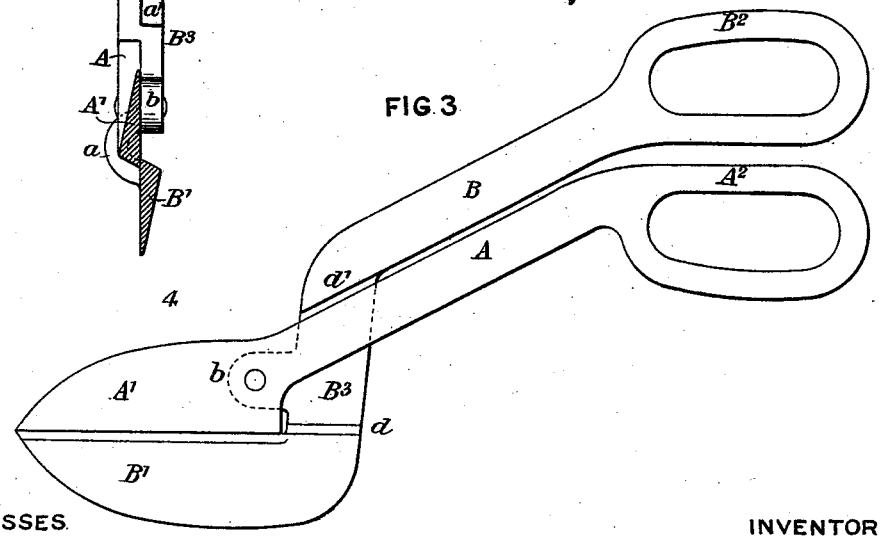

In the accompanying drawings, Figure 1 is a side view of one form of shears constructed in accordance with my invention. Fig. 2 is a transverse sectional view of the same on the line 2 2. Fig. 3 is a side view of another pair of shears embodying my invention, and Fig. 4 is a transverse sectional view of said pair of shears on the line 4 4, Fig. 3.

In either case the shears are composed of two levers A and B each having at its forward end a cutting blade A' or B', and at its rear end a handle $A^2$ or $B^2$, the lever A having the upper blade and lower handle, and the lever B having the lower blade and upper handle, the two handles being preferably so disposed laterally as to lie in substantially the same plane one above the other for convenience of manipulation.

The lever A forms a substantially straight rearward continuation of the blade A', but the lever B extends first upwardly from the rear end of its blade B' and then backwardly to the handle $B^2$, and in the upwardly extending portion or post $B^3$ of said lever B is formed a lateral offset which, in the case of the shears shown in Fig. 1, is limited in height and is a U-shaped or reverse offset as shown at $a$, so that the upper portion of the post $B^3$ is in the same plane as the blade B', there being a second lateral offset $a'$ at the top of the post so as to bring the lever B and its handle into line with the lever A and its handle. This lateral offset at the rear of the blade provides for the proper clearance of the strips of metal cut by the blades of the shears, one cut strip passing rearward on the right hand side of the blade A' through the offset and the other strip passing downward on the left hand side of the blade B' beneath said offset.

From the post $B^3$ of the lever B projects forward a finger $b$ to which the lever A is pivoted so that the pivot point of said lever can be adjacent to or in advance of the rear end of its cutting blade A'. Hence the point at which the cut can begin is closely adjacent to the pivotal line of the shears, and very powerful leverage can be exerted in effecting the cutting operation, so that sheet metal of considerable thickness can be severed with comparative ease, the shears being thus adapted for the performance of work which cannot possibly be accomplished by the use of shears pivoted together where they cross in the rear of the cutting blades as usual. The increased leverage gained by advancing the pivot of the lever A will depend upon the extent of this advance, which can be regulated in accordance with the desired gain in leverage.

In the shears shown in Figs. 3 and 4, the post $B^3$ of the lever B has a U-shaped offset formed by the lower and upper lateral offsets $d\ d'$. The lower offset $d$ is at the rear of the blade B' and the forwardly projecting finger $b$ is formed upon this laterally offset portion of the lever, the upper portion of the lever having the reverse offset $d'$ whereby it is brought into line with the lever A.

I do not in this application claim the construction in which both levers have a lateral offset, as such a construction is shown in my Patent No. 513,542, dated January 30, 1894. In the present construction all of the lateral offset is upon one lever, and the other lever is in the same plane throughout, a construction which is preferable to that formerly patented, because it permits of the exertion of the power more effectually and facilitates the making and fitting together of the parts.

Having thus described my invention, I claim and desire to secure by Letters Patent—

1. The combination in sheet metal shears, of the two levers pivoted together, and each having a cutting blade at the forward end, and an operating handle at the rear end, one lever having the upper blade, and the lower handle, and the other lever having the lower blade and the upper handle, one of the levers being in the same plane throughout, but the other lever having a U-shaped lateral offset in the rear of its blade, and having a portion projecting forwardly beyond the rear end of said blade so as to provide for the advance of the pivot for the lever of the upper blade, substantially as specified.

2. The combination in sheet metal shears, of the two levers pivoted together and each having a cutting blade at the forward end, and an operating handle at the rear, one lever having the upper blade and lower handle, and the other lever having the lower blade and upper handle, one lever being in the same plane throughout, but the other lever having a U-shaped lateral offset in the rear of its blade, and another lateral offset outwardly beyond the lever of the other blade, substantially as specified.

In testimony whereof I have signed my name to this specification in the presence of two subscribing witnesses.

GEORGE H. STOCKMANN.

Witnesses:
FRANK BECHTOLD,
JOSEPH H. KLEIN.